(12) United States Patent
   Cummings

(10) Patent No.: US 11,047,346 B2
(45) Date of Patent: Jun. 29, 2021

(54) FUEL ADDITIVE SYSTEM FOR A DIESEL FUEL ENGINE

(71) Applicant: Kevin Cummings, Flower Mound, TX (US)

(72) Inventor: Kevin Cummings, Flower Mound, TX (US)

(*) Notice: Subject to any disclaimer, the term of this patent is extended or adjusted under 35 U.S.C. 154(b) by 0 days.

(21) Appl. No.: 16/676,710

(22) Filed: Nov. 7, 2019

(65) Prior Publication Data

US 2020/0149499 A1   May 14, 2020

Related U.S. Application Data

(60) Provisional application No. 62/757,560, filed on Nov. 8, 2018.

(51) Int. Cl.
   *F02M 25/14*   (2006.01)
   *F02M 43/00*   (2006.01)
   *B60K 15/03*   (2006.01)
   *F02M 37/08*   (2006.01)

(52) U.S. Cl.
   CPC .......... *F02M 25/14* (2013.01); *B60K 15/03* (2013.01); *F02M 43/00* (2013.01); *B60K 2015/03348* (2013.01); *F02M 2037/087* (2013.01); *F02M 2200/95* (2013.01)

(58) Field of Classification Search
   CPC ............ F02M 25/14; F02M 2037/087; F02M 2200/95; F02M 25/00; F02M 43/00; F02M 43/02; F02M 43/04; B60K 15/03; B60K 2015/03348
   See application file for complete search history.

(56) References Cited

U.S. PATENT DOCUMENTS

| | | | | |
|---|---|---|---|---|
| 3,392,753 A | * | 7/1968 | Kleinmann | B01J 4/008 137/564.5 |
| 4,161,160 A | * | 7/1979 | Hicks | F02M 43/00 123/1 A |
| 4,346,689 A | * | 8/1982 | Neely | F02B 77/04 123/1 A |
| 4,557,221 A | * | 12/1985 | Kamel | F02B 51/00 123/1 A |
| 2018/0179967 A1 | * | 6/2018 | Jennings | C10L 1/231 |

OTHER PUBLICATIONS

FoxValves "Fox Valve Liquid Eductors Data Sheet", Fox Bulletin 111, Published 2017.*

* cited by examiner

*Primary Examiner* — Jacob M Amick
(74) *Attorney, Agent, or Firm* — Welsh Flaxman & Gitler LLC

(57) ABSTRACT

A fuel additive system includes a fuel supply having an intake manifold, a fuel tank, a fuel supply line, and a fuel delivery system. A fuel additive supply is fluidly connected to the fuel supply for adding fuel additive to fuel from the fuel supply. The fuel additive supply includes a fuel additive tank and a fuel additive supply line connecting the fuel additive tank to the fuel supply.

14 Claims, 4 Drawing Sheets

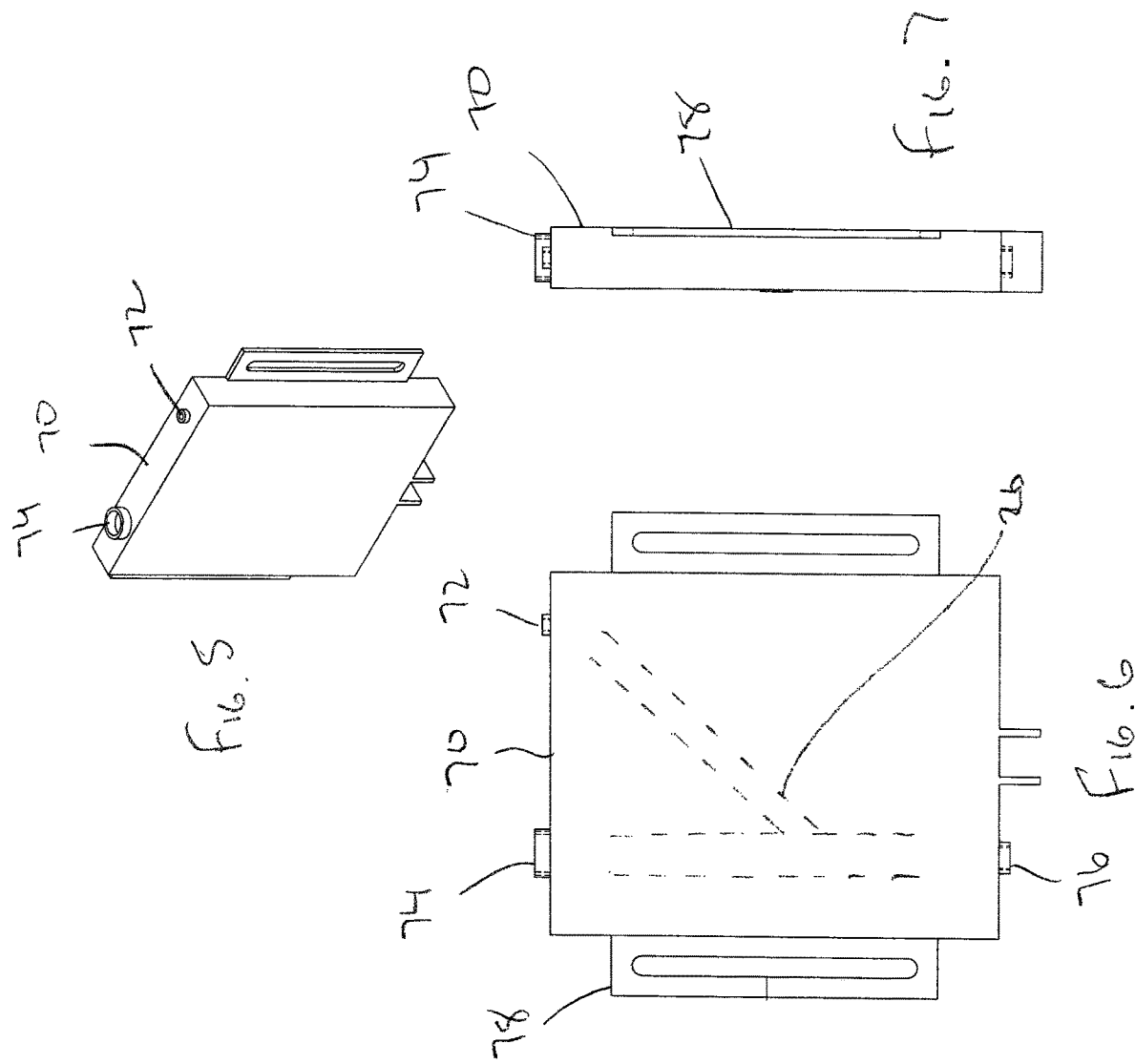

FUEL ADDITIVE SYSTEM FOR A DIESEL FUEL ENGINE

CROSS REFERENCE TO RELATED APPLICATION

This application claims the benefit of U.S. Provisional Patent Application Ser. No. 62/757,560, entitled "FUEL ADDITIVE SYSTEM FOR A DIESEL FUEL ENGINE," filed Nov. 8, 2018.

BACKGROUND OF THE INVENTION

1. Field of the Invention

The present invention relates to a fuel additive system for a diesel fuel engine, in particular, a diesel fuel engine of a vehicle.

2. Description of the Related Art

It is often necessary to supplement diesel fuel with additives. These additives are used to improve fuel handling, improve fuel stability, enhance engine protection, and optimize combustion. However, the addition of these supplements to the diesel fuel is often and difficult and time consuming activity. As such, the present invention provides a system for adding fuel additives in a manner which is convenient, efficient, and reliable.

SUMMARY OF THE INVENTION

It is, therefore, an object of the present invention to provide a fuel additive system. The fuel additive system includes a fuel supply having an intake manifold, a fuel tank, a fuel supply line, and a fuel delivery system. A fuel additive supply is fluidly connected to the fuel supply for adding fuel additive to fuel from the fuel supply. The fuel additive supply includes a fuel additive tank and a fuel additive supply line connecting the fuel additive tank to the fuel supply.

It is also an object the present invention to provide a fuel additive system wherein the fuel additive tank includes a filling port that may be selectively opened and closed to allow for selective filling thereof.

It is another object the present invention to provide a fuel additive system wherein a coupling member connects the fuel additive supply line to the fuel supply line.

It is a further object the present invention to provide a fuel additive system wherein the coupling member is a Y-shaped valve having a fuel first pipe and a fuel additive second pipe that meets the fuel first pipe at an acute angle, the fuel first pipe and the fuel additive second pipe intersecting at a mixing chamber located in a central portion of the fuel first pipe between a first end and a second end of the coupling member.

It is also an object the present invention to provide a fuel additive system wherein the coupling member utilizes the Venturi effect to pull a controlled amount of fuel additive into diesel fuel passing through the fuel supply line and the fuel first pipe so as to produce an additive fuel mixture.

It is another object the present invention to provide a fuel additive system wherein the coupling member utilizes the Venturi effect to pull a controlled amount of fuel additive into diesel fuel passing through the fuel supply line.

It is a further object the present invention to provide a fuel additive system wherein the fuel supply provides diesel fuel to an internal combustion engine.

It is also an object the present invention to provide a fuel additive system including a fuel supply and a fuel additive supply fluidly connected to the fuel supply for adding fuel additive to fuel from the fuel supply via application of the Venturi effect. The fuel additive supply includes a fuel additive tank and a fuel additive supply line connecting the fuel additive tank to the fuel supply.

Other objects and advantages of the present invention will become apparent from the following detailed description when viewed in conjunction with the accompanying drawings, which set forth certain embodiments of the invention.

DESCRIPTION OF THE DRAWINGS

FIGS. 5, 6, and 7 are respectively a perspective view, a front view, and a side view of a housing for the coupling member.

DESCRIPTION OF THE PREFERRED EMBODIMENT

Figure 1:
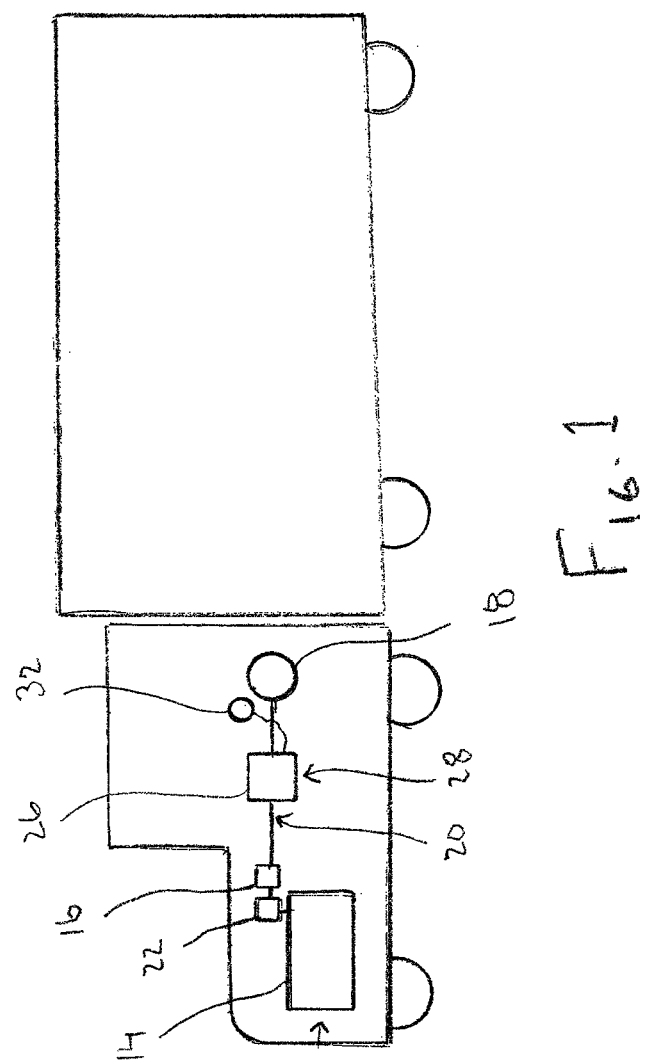
FIG. 1 is a schematic view of a fuel additive system in accordance with the present invention within a vehicle.
Figure 2:
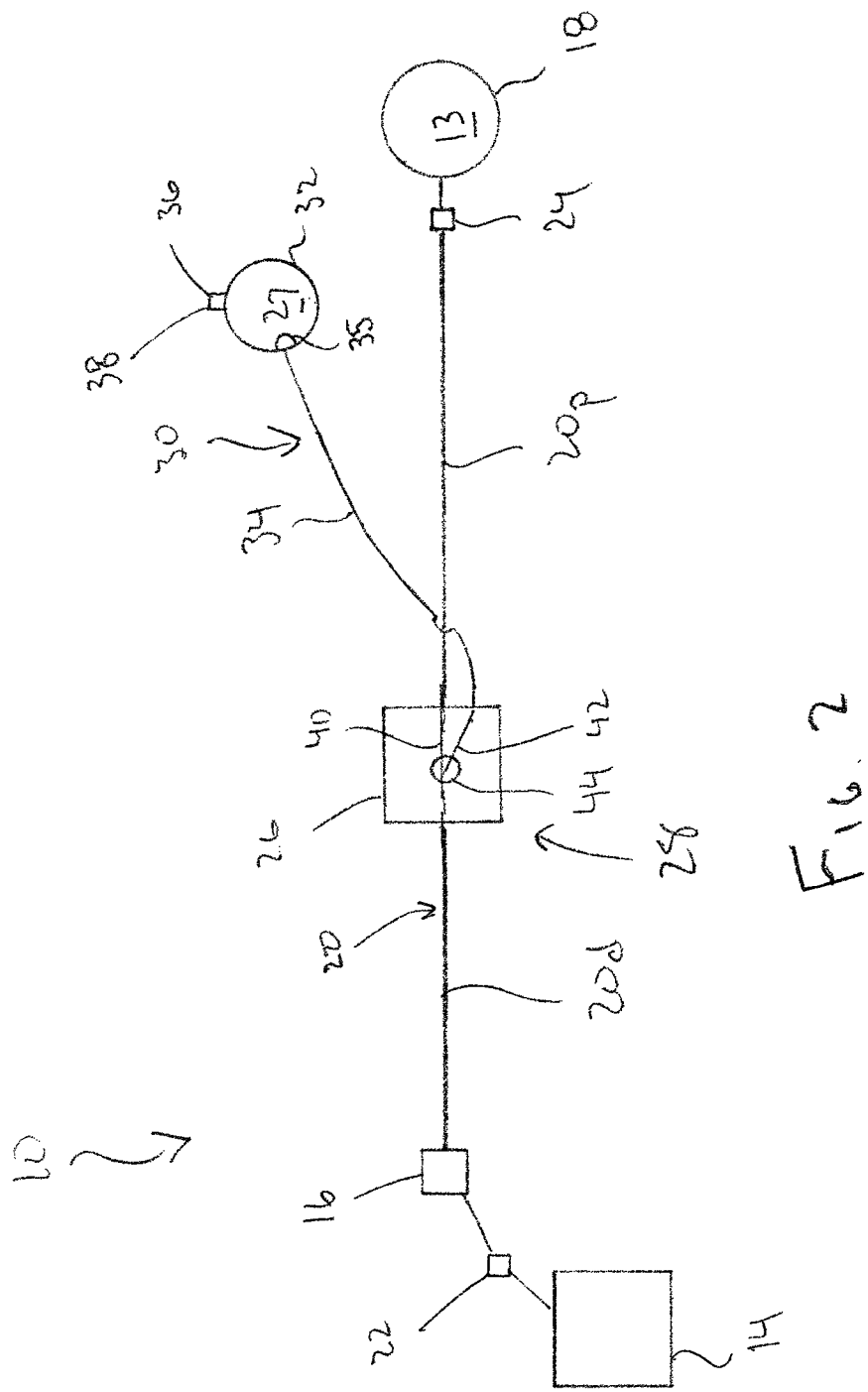
FIG. 2 is a schematic view of the fuel additive system.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 7, a fuel additive system 10 is disclosed. It is appreciated the present fuel additive system 10 may be retrofitted into an existing diesel fuel system or the fuel additive system 10 may be integrated into new diesel fuel systems. The fuel additive system 10 is particularly adapted for integration into a diesel fuel system of a vehicle, for example, a truck as referenced herein. However, it is appreciated the fuel additive system 10 could be integrated for use with a variety of diesel fuel systems without departing from the spirit of the invention.

Throughout the present disclosure, relative terms such "above" and "below" are used. These terms are meant to refer to the position of various elements of the present fuel additive system when the vehicle in which it is integrated is positioned on a horizontal support surface in its upright use position.

In accordance with a preferred embodiment, the fuel additive system 10 includes a conventional fuel supply 28. As those skilled in the art will appreciate, the fuel supply 28 provides diesel fuel 13 to an internal combustion engine 14 to produce power used in the propulsion of a vehicle in a conventional fashion. The internal combustion engine 14 is fluidly connected to an intake manifold 16. Diesel fuel 13 from a conventional fuel tank 18 is also in fluid communication with the internal combustion engine 14. A fuel supply line 20 fluidly connects the fuel tank 16 to the intake manifold 16, where the diesel fuel 13 is directed to the internal combustion engine 14 via a fuel delivery system 22 such as a carburetor or fuel injection system. Flow of the diesel fuel 13 from the fuel tank 18 to the fuel delivery system 22 is facilitated by the provision of a fuel pump 24 adjacent the fuel tank 18 that forces diesel fuel 13 to flow from the fuel tank 18 to the fuel delivery system 22 in a controlled manner. As will be appreciated based upon the following disclosure, the fuel supply line 20 is composed of a proximal fuel supply line 20$p$ and a distal fuel supply line 20$d$, which are connected by a coupling member 26 that allows for the mixing of a fuel additive 27 with the diesel fuel 13.

Those skilled in the art will appreciate that the primary purpose of the intake manifold 16 is to provide air to the internal combustion engine 14 and that the primary purpose of the fuel delivery system 22 is to control the diesel fuel 13 supplied to the internal combustion engine 14 such that the diesel fuel 13 is distributed within the air which is ultimately delivered to combustion chambers of the pistons and cylinders within the internal combustion engine 14. As such, the fuel supply 28 is considered to be composed of the intake manifold 16, the fuel tank 18, the fuel supply line 20, and the fuel delivery system 22, as well as other components known by those skilled in the art to optimize the delivery of diesel fuel 13 to the internal combustion engine 14.

The fuel additive system 10 of the present invention also includes a fuel additive supply 30 that adds fuel additive 27 to the diesel fuel 13 in a controlled manner. The fuel additive supply 30 is fluidly connected to the fuel supply 28, and includes a fuel additive tank 32 and a fuel additive supply line 34. The fuel additive tank 32 is filled with a desired fuel additive 27. As such, the fuel additive tank 32 is provided with a filling port 36 that may be selectively opened and closed, via a removable cap 38, to allow for selective filling thereof. As the fuel additive 27 may be highly corrosive, the fuel additive tank 32 is preferably made of stainless steel and the fuel additive supply line 34 is preferably made of VITON® (a synthetic rubber and rubber composition manufactured by The Chemours Company FC) tubing. It is contemplated that if filtration is required, a microglass filter 35 is positioned within the fuel additive tank 32 so as to filter the fuel additive 27 as it flows into the fuel additive supply line 34.

The fuel additive supply line 34 connects the fuel additive tank 32 to the fuel supply line 20. In particular, the fuel additive supply line 34 is connected to the fuel supply line 20 via a coupling member 26 integrated into the fuel supply line 20. As with the fuel additive tank 32, and considering the corrosive nature of the fuel additive 27, the coupling member 26 is also preferably made of stainless steel.

Figure 3:
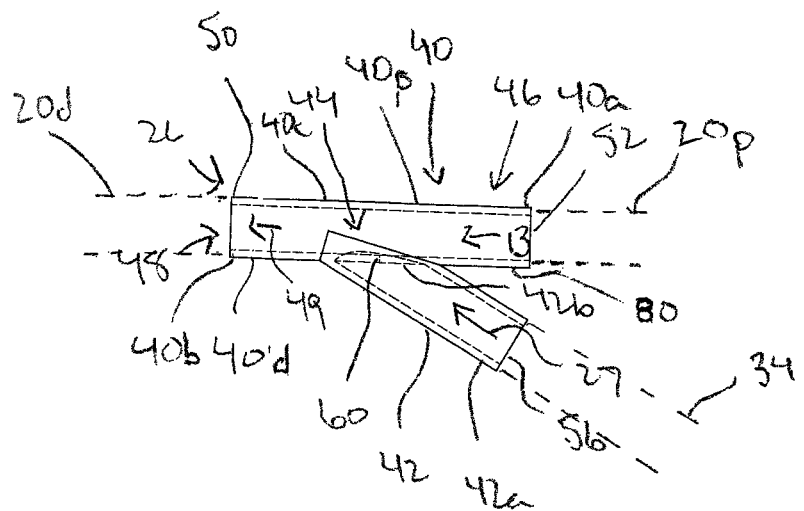
FIG. 3 is a side view of the coupling member of the fuel additive system.
Figure 4:
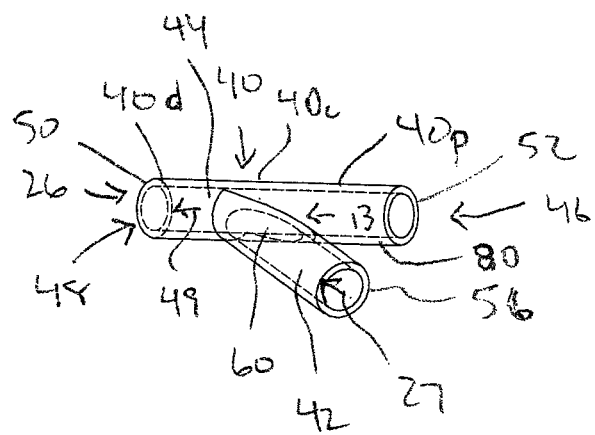
FIG. 4 is a perspective view of the coupling member shown in FIG. 3.

In accordance with a preferred embodiment, and with particular reference to FIGS. 3 and 4, the coupling member 26 is a Y-shaped valve having a fuel first pipe 40 and a fuel additive second pipe 42 that meets the fuel first pipe 40 at an acute angle. The fuel first pipe 40 and the fuel additive second pipe 42 intersect at a mixing chamber 44 located in a central portion 40$c$ of the fuel first pipe 40, that is, between the first end 46 and the second end 48 of the coupling member 26. With this in mind, one may consider the fuel first pipe 40 to include a proximal fuel first pipe portion 40$p$ and a distal fuel first pipe portion 40$d$ (that meet at the central portion 40$c$ of the fuel first pipe 40) with the mixing chamber 44 located therebetween, and the proximal fuel first pipe portion 40$p$ and the distal fuel first pipe portion 40$d$ extending along substantially the same longitudinal axis.

As such, and as will be fully appreciated based upon the following disclosure, diesel fuel 13 enters the fuel first pipe 40 at the proximal fuel first pipe portion 40$p$, mixes with the fuel additive 27 in the mixing chamber 44 to form the additive fuel mixture 49, and the additive fuel mixture 49 exits the fuel first pipe 40 at the outlet 50 of the distal fuel first pipe portion 40$d$. The coupling member 26 utilizes the Venturi effect to pull a controlled amount of fuel additive 27 into the diesel fuel 13 passing through the fuel supply line 20 and the fuel first pipe 40 so as to produce an additive fuel mixture 49 that may ultimately be used to power the internal combustion engine 14. As those skilled in the art will appreciate, the Venturi effect dictates that a fluid flowing through a pipe creates pressure proportional to the speed of the flow, and therefore, the speed of the fluid flow of a primary fluid determines the amount of a secondary fluid that may be drawn into the primary fluid when the primary fluid flows through a section of a pipe providing access to the secondary fluid. The fluid pressure in the case of the present invention is used to allow for an injection of the fuel additive 27 into the diesel fuel 13 as it moves through the coupling member 26.

Desired fluid flow is maintained so long as the fuel additive tank 32 is positioned at an appropriate height within the vehicle to allow for gravity and atmospheric pressure to ensure the fuel additive 27 is always ready to mix with the diesel fuel 13. In particular, the fuel additive tank 32 is positioned within the vehicle such that it remains above the access opening 60 connecting the central portion 40$c$ of the fuel first pipe 40 with the second end 42$b$ of the fuel additive second pipe 42, that is, the juncture of the first and second pipes 40, 42. As will be explained below in greater detail, undesired mixing of the fuel additive 27 and the diesel fuel 13, when the diesel fuel 13 is not flowing, is prevented by positioning the second end 42$b$ of the fuel additive second pipe 42 such that it is below the first fuel pipe 40 and the mixing chamber 44. In particular, the access opening 60 connecting the central portion 40$c$ of the fuel first pipe 40 with the second end 42$b$ of the fuel additive second pipe 42 is positioned within the vehicle such that it is at the lowest relative position along the circumference of the first fuel pipe 40 at the junction of the first and second pipes 40, 42. In this way, fuel additive 27 is only mixed with the diesel fuel 13 when the diesel fuel 13 is flowing through the system.

As such, the coupling member 26 employs a Venturi arrangement with the mixing chamber 44 for combining the fuel additive 27 and the diesel fuel 13. The coupling member 26 has a first end 46 and a second end 48. The first end 46 of the coupling member 26 includes a multi-channel arrangement including first and second inputs 52, 56 for respective attachment to the proximal fuel supply line 20$p$ and the fuel additive supply line 34. The first and second inputs 52, 56 respectively lead to the fuel first pipe 40, in particular, the proximal fuel first pipe portion 40$p$ of the fuel first pipe 40, and the fuel additive second pipe 42 of the multi-channel arrangement of the coupling member 26. The first and second pipes 40, 42 lead to, and are in fluid communication with, the mixing chamber 44 located in the central portion 40$c$ of the fuel first pipe 40, that is, between the first end 46 and the second end 48 of the coupling member 26. An output 50 is located at the second end 48 of the coupling member 26, and is secured to the continuation of the fuel supply line 20, in particular, the distal fuel supply line 20$d$, as it extends to the fuel delivery system 22 to deliver the additive fuel mixture to the internal combustion engine 14.

The fuel first pipe 40 and the fuel additive second pipe 42 are interconnected in a manner creating a Venturi effect causing the diesel fuel 13, which is pressurized under the control of the fuel pump 24, to effectively pull the fuel additive 27 through the fuel additive second pipe 42 and into the mixing chamber 44. With the application of the Venturi effect, in combination with the maintenance of pressure within the fuel first pipe 40 even when the diesel fuel 13 is not flowing and the positioning of the fuel additive second pipe 42 beneath the first fuel pipe 40 and the mixing chamber 44, the fuel additive 27 is only pulled into the mixing chamber 44 when the diesel fuel 13 flows through the system, in particular, the mixing chamber 44. In accordance with a preferred embodiment, the diameter of the fuel first pipe 40 is 0.75 inches.

As mentioned above, the fuel additive second pipe 42 is in fluid communication with the fuel first pipe 40. This is achieved by the provision of an access opening 60 connecting the central portion 40c of the fuel first pipe 40 with the second end 42b of the fuel additive second pipe 42. In accordance with a preferred embodiment, the access opening 60 is much smaller than the diameter of the fuel additive second pipe 42 (for example, the access opening 60 preferably ranges in size from 5 to 10 microns), and the fuel additive second pipe 42 is secured to the outer wall 80 of the fuel first pipe 40 with the access opening 60 formed in the outer wall 80 of the fuel first pipe 40 to allow for the passage of fuel additive 27 into the fuel first pipe 40. In accordance with a preferred embodiment, the access opening 60 is 8 microns in diameter. In particular, the fuel additive second pipe 42 includes a first end 42a adjacent the first end 46 of the coupling member 26 and a second end 42b adjacent the mixing chamber 44 and the access opening 60 and the mixing chamber 44. In accordance with a preferred embodiment, the diameter of the fuel additive second pipe 42 is 0.75 inches and remains consistent as it extends from the first end 42a thereof to the second end 42b thereof.

The proximal fuel supply line 20p supplies the pressurized diesel fuel 13 and the fuel additive supply line 34 supplies the fuel additive 27. As such, the proximal fuel supply line 20 is connected to, and in fluid communication with, the first end 40a of the fuel first pipe 40 of the coupling member 26 and the fuel additive supply line 34 is connected to, and in fluid communication with, the first end 42a of the fuel additive second pipe 42 of the coupling member 26. In practice, the fuel additive 27 travels through the fuel additive supply line 34 and into the fuel additive second pipe 42 when pressurized diesel fuel 13 enters the fuel first pipe 40, and the fuel additive 27 passes through the access opening 60 into the mixing chamber 44. The pressurized diesel fuel 13 entering the coupling member 26 imparts negative pressure on the fuel additive 27 and draws the fuel additive 27 through the fuel additive second pipe 42 and the fuel additive supply line 34, and into the mixing chamber 44 due to the Venturi effect where the fuel additive 27 is mixed with the diesel fuel 13 to produce the additive fuel mixture 49. The additive fuel mixture 49 is then forced through the outlet 50 at the distal fuel first pipe portion 40d and into the supply line 20d (with is connected to the second end 40b of the fuel first pipe 40), and ultimately to the internal combustion engine 14. In accordance with a preferred embodiment, the fuel additive 27 is drawn into the diesel fuel 13 so as to produce a 1:1,500 dilution, although it is appreciated the fuel additive 27 will still be effective at dilution rates as high as 1:4,500.

In accordance with a preferred embodiment, a housing 70 is provided for the coupling member 26. As such, the housing is provided with first, second and third access apertures 72, 74, 76 allowing respectively for the passage of the additive supply line 34, the proximal fuel supply line 20p and the distal fuel supply line 20d therethrough for connection with the coupling member 26 as discussed above. The housing 70 further includes various mounting brackets 78 for selective attachment of the housing 70 to various support structures of the vehicle.

While the preferred embodiments have been shown and described, it will be understood that there is no intent to limit the invention by such disclosure, but rather, is intended to cover all modifications and alternate constructions falling within the spirit and scope of the invention.

The invention claimed is:
1. A fuel additive system, comprising:
a fuel supply including an intake manifold, a fuel tank, a fuel supply line, and a fuel delivery system; and
a fuel additive supply fluidly connected to the fuel supply for adding fuel additive to fuel from the fuel supply, the fuel additive supply includes a fuel additive tank and a fuel additive supply line connecting the fuel additive tank to the fuel supply;
a coupling member connecting the fuel additive supply line to the fuel supply line, the coupling member has a fuel first pipe and a fuel additive second pipe that intersect at a mixing chamber located in a central portion of the fuel first pipe between a first end and a second end of the coupling member, wherein the coupling member utilizes the Venturi effect to pull a controlled amount of fuel additive into diesel fuel passing through the fuel supply line and the fuel first pipe so as to produce an additive fuel mixture without the need for a pump forcing fuel additive through the fuel additive supply line, the fuel additive second pipe is positioned beneath the first fuel pipe and the mixing chamber, such that the fuel additive is only pulled into the mixing chamber when the fuel flows through the system and the fuel additive tank is positioned such that it remains above an access opening connecting the central portion of the fuel first pipe with the second end of the fuel additive second pipe, and the coupling member includes a housing provided with first, second and third access apertures allowing respectively for the passage of the additive supply line, the proximal fuel supply line and the distal fuel supply line therethrough for connection with the coupling member, the housing further including at least one mounting bracket for selective attachment of the housing to various support structures of a vehicle.

2. The fuel additive system according to claim 1, wherein the fuel additive tank includes a filling port that may be selectively opened and closed to allow for selective filling thereof.

3. The fuel additive system according to claim 1, wherein the coupling member is a Y-shaped valve having the fuel first pipe and the fuel additive second pipe that meets the fuel first pipe at an acute angle.

4. The fuel additive system according to claim 3, wherein the fuel first pipe includes a proximal fuel first pipe portion and a distal fuel first pipe portion that meet at the central portion of the fuel first pipe with the mixing chamber located therebetween.

5. The fuel additive system according to claim 4, wherein the proximal fuel first pipe portion and the distal fuel first pipe portion extend along substantially a longitudinal axis.

6. The fuel additive system according to claim 1, wherein the fuel supply provides diesel fuel to an internal combustion engine.

7. A fuel additive system, comprising:
a fuel supply;

a fuel additive supply fluidly connected to the fuel supply for adding fuel additive to fuel from the fuel supply via application of the Venturi effect, the fuel additive supply includes a fuel additive tank and a fuel additive supply line connecting the fuel additive tank to the fuel supply;

a coupling member connecting the fuel additive supply line to the fuel supply line, the coupling member has a fuel first pipe and a fuel additive second pipe that intersect at a mixing chamber located in a central portion of the fuel first pipe between a first end and a second end of the coupling member, wherein the coupling member utilizes the Venturi effect to pull a controlled amount of fuel additive into diesel fuel passing through the fuel supply line and the fuel first pipe so as to produce an additive fuel mixture without the need for a pump forcing fuel additive through the fuel additive supply line, the fuel additive second pipe is positioned beneath the first fuel pipe and the mixing chamber, such that the fuel additive is only pulled into the mixing chamber when the fuel flows through the system and the fuel additive tank is positioned such that it remains above an access opening connecting the central portion of the fuel first pipe with the second end of the fuel additive second pipeand the coupling member includes a housing provided with first, second and third access apertures allowing respectively for the passage of the additive supply line, the proximal fuel supply line and the distal fuel supply line therethrough for connection with the coupling member, the housing further including at least one mounting bracket for selective attachment of the housing to various support structures of a vehicle.

8. The fuel additive system according to claim 7, wherein the fuel supply includes an intake manifold, a fuel tank, a fuel supply line, and a fuel delivery system.

9. The fuel additive system according to claim 7, wherein the fuel additive tank includes a filling port that may be selectively opened and closed to allow for selective filling thereof.

10. The fuel additive system according to claim 9, wherein the fuel supply includes an intake manifold, a fuel tank, a fuel supply line, and a fuel delivery system.

11. The fuel additive system according to claim 7, wherein the coupling member is a Y-shaped valve having the fuel first pipe and the fuel additive second pipe that meets the fuel first pipe at an acute angle.

12. The fuel additive system according to claim 11, wherein the fuel first pipe includes a proximal fuel first pipe portion and a distal fuel first pipe portion that meet at the central portion of the fuel first pipe with the mixing chamber located therebetween.

13. The fuel additive system according to claim 12, wherein the proximal fuel first pipe portion and the distal fuel first pipe portion extend along substantially a longitudinal axis.

14. The fuel additive system according to claim 7, wherein the fuel supply provides diesel fuel to an internal combustion engine.

* * * * *